United States Patent
Skowronek et al.

(10) Patent No.: US 10,221,826 B2
(45) Date of Patent: Mar. 5, 2019

(54) IGNITION SYSTEM AND METHOD FOR OPERATING AN IGNITION SYSTEM FOR AN INTERNAL COMBUSTION ENGINE

(71) Applicant: Robert Bosch GmbH, Stuttgart (DE)

(72) Inventors: Tim Skowronek, Missen-Wilhams (DE); Thomas Pawlak, Immenstadt (DE); Wolfgang Sinz, Hergatz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 393 days.

(21) Appl. No.: 15/032,829

(22) PCT Filed: Oct. 16, 2014

(86) PCT No.: PCT/EP2014/072248
§ 371 (c)(1),
(2) Date: Jul. 27, 2016

(87) PCT Pub. No.: WO2015/071050
PCT Pub. Date: May 21, 2015

(65) Prior Publication Data
US 2016/0356259 A1    Dec. 8, 2016

(30) Foreign Application Priority Data

Nov. 14, 2013  (DE) .......................... 10 2013 223 219
Aug. 13, 2014  (DE) .......................... 10 2014 216 028

(51) Int. Cl.
*F02P 3/04* (2006.01)
*F02P 9/00* (2006.01)
(Continued)

(52) U.S. Cl.
CPC ............. *F02P 9/007* (2013.01); *F02P 3/0407* (2013.01); *F02P 3/0442* (2013.01);
(Continued)

(58) Field of Classification Search
CPC .......... F02P 9/007; F02P 3/0407; F02P 15/10; Y02T 10/46
See application file for complete search history.

(56) References Cited

U.S. PATENT DOCUMENTS 4,558,685 A    12/1985  Ishikawa et al.
4,639,676 A *   1/1987  Kawai ................... F02P 9/002
                                                        324/380
(Continued)

FOREIGN PATENT DOCUMENTS

| JP | 5934487 A | 2/1984 |
| JP | 59203874 | 11/1984 |
| JP | 63150466 | 6/1988 |

OTHER PUBLICATIONS

International Search Report dated Feb. 2, 2015 for International Application No. PCT/EP2014/072248.

*Primary Examiner* — Hieu T Vo
*Assistant Examiner* — Arnold Castro
(74) *Attorney, Agent, or Firm* — Norton Rose Fulbright US LLP; Gerard Messina

(57) ABSTRACT

A method for operating an ignition system for an internal combustion engine, including a first voltage generator and a bypass, is described. The bypass may include, for example, a boost converter for maintaining a spark generated with the aid of the first voltage generator. A speed of an internal combustion engine used with the ignition system is ascertained and the operating mode of the bypass is modified in response to the speed change.

15 Claims, 3 Drawing Sheets

(51) Int. Cl.
  *F02P 5/15*   (2006.01)
  *F02P 15/10*  (2006.01)
  *F02P 17/12*  (2006.01)

(52) U.S. Cl.
  CPC ........... *F02P 5/1502* (2013.01); *F02P 5/1514* (2013.01); *F02P 15/10* (2013.01); *F02P 5/1516* (2013.01); *F02P 2017/121* (2013.01); *Y02T 10/46* (2013.01)

(56) References Cited

U.S. PATENT DOCUMENTS

| | | | |
|---|---|---|---|
| 8,813,732 B2* | 8/2014 | Kataoka | F02P 3/051 |
| | | | 123/621 |
| 9,531,165 B2* | 12/2016 | Ruan | F02P 3/053 |
| 2004/0000878 A1* | 1/2004 | Petruska | F02P 3/0876 |
| | | | 315/209 CD |
| 2007/0175461 A1* | 8/2007 | Wada | F02P 3/051 |
| | | | 123/637 |
| 2016/0281673 A1* | 9/2016 | Skowronek | F02P 17/12 |
| 2016/0312757 A1* | 10/2016 | Skowronek | F02P 9/007 |
| 2016/0348633 A1* | 12/2016 | Skowronek | F02P 3/0407 |
| 2016/0356259 A1* | 12/2016 | Skowronek | F02P 3/0442 |

\* cited by examiner

# IGNITION SYSTEM AND METHOD FOR OPERATING AN IGNITION SYSTEM FOR AN INTERNAL COMBUSTION ENGINE

FIELD OF THE INVENTION

The present invention relates to a method for operating an ignition system for an internal combustion engine. The present invention relates, in particular, to improvements in wear prevention in such ignition systems, in which the spark duration is controllable.

BACKGROUND INFORMATION

Ignition systems for internal combustion engines are known to be based on a high voltage generator, with the aid of which energy originating from the vehicle battery is converted into high voltages, which are applied at a spark gap in order to ignite a combustible mixture in the internal combustion engine. In this process, a current flowing through the step-up transformer is abruptly interrupted, whereupon the energy stored in the magnetic field of the step-up transformer discharges in the form of a spark. Once the stored energy is discharged, the ignition spark is extinguished. Ignition systems are also known in the related art, in which the first voltage generator ("primary voltage generator") is supplemented by a second voltage generator ("secondary voltage generator"), with the aid of which an existing ignition spark is supplied with electrical energy and may therefore be maintained independently of the stored energy quantity. A system of this type is known, for example, from the related art. Due to the discharge characteristics of the high voltage generator, a current flows, in particular, at the start of the spark discharge, that is so high that the electrodes of the spark gap become eroded. In the process, a spark duration prolonged with the aid of the secondary voltage generator increases erosion.

SUMMARY OF THE INVENTION

An object of the present invention is to eliminate the aforementioned disadvantage of the related art.

The aforementioned object may be achieved according to the present invention by a method for operating an ignition system for an internal combustion engine, including one first voltage generator ("primary voltage generator") and one bypass for maintaining a spark generated with the aid of the primary voltage generator. The bypass in this case may include, in particular, a boost converter or may be configured as a boost converter. A spark generated by the primary voltage generator (for example, a step-up transformer) is supported by the bypass in a suitable manner by energy drawn from the vehicle electrical system. According to the present invention, a speed of an internal combustion engine used with the ignition system is ascertained. This may take place, for example, as a readout of a digital control signal (for example, via a signal line or a bus system) or a calculation of the speed based on the change of the crank angle of the internal combustion engine over time. In this way, a speed change of the internal combustion engine may be ascertained. The operating mode of the bypass is modified in response to the altered speed. In this way, the energy, with the aid of which the bypass supplies the ignition spark, may be controlled as a function of an instantaneous operating state of the internal combustion engine. Since, according to the present invention, a dose of ignition spark energy provided via the bypass occurs as a function of the respective operating state, it is possible to reduce spark erosion on the electrodes of the ignition system. The generation of heat loss in the boost converter is also reduced. Another advantage to be cited is the robustness and the durability of the ignition system.

Furthermore, lower requirements may be imposed in the component selection, whereby smaller components may also be used ("downsizing"). Finally, electromagnetic control levels may also be reduced, which improves the electromagnetic compatibility (EMC).

The further descriptions provide refinements of the present invention.

Modifying the operating mode may include modifying a time interval of the voltage generation by the bypass. In other words, the time interval in which the ignition spark is provided with energy, is adjusted as a function of the change in speed. A reduction in the length of the time interval, in particular, may reduce the spark erosion on the electrodes.

For example, the modification of the time interval may include a shifting of the time interval across the crank angle and alternatively or in addition, a lengthening or shortening of the time interval. By shifting the time interval across the crank angle, it is possible to vary the point in time at which the bypass supports an ignition spark generated via the primary voltage generator. Since the ignition timing is normally advanced when the speed is increased, a seamless reinforcement of the ignition spark with the aid of the bypass may therefore take place. A spark breakaway may then be effectively prevented. The time interval may also be lengthened or shortened as a function of the speed. The higher the speed, the shorter the duration of the ignition spark may be selected. For example, a first duration for the ignition spark may be provided in one speed range, which falls below a predefined threshold value, whereas a second shorter duration may be provided above the threshold value. In this way, the erosion may be reduced as a function of the operating state.

The speed may be advantageously classified, and the class compared with a predefined reference. In other words, speed ranges may be predefined and the instantaneously ascertained speed may be assigned to a corresponding range. This makes it possible to reduce the effort in conjunction with the evaluation and to reduce the memory requirement for different references.

The speed signal may, for example, be obtained by evaluating a signal of an engine control unit. The engine control unit already ascertains the instantaneous speed of the internal combustion engine, so that this signal may be used according to the present invention with no additional outlay. The signal may be transmitted to the ignition system via a separate signal line or via a (e.g. digital) bus. Alternatively or in addition, the speed signal may be carried out within the ignition system, for example, by evaluating a crank angle over time. An electrical control or an analog circuit, a microcontroller or an ASIC (in the case of prototypes, a field programmable gate array (FPGA)) of the ignition system may, in particular, be used for this purpose. In this way, the ignition system does not depend on the provision of an external speed signal and may undertake a suitable resolution or a suitable effort for ascertaining an instantaneous speed. Thus, it is possible to both use existing hardware resources and to reduce the communication effort.

An additional reduction in effort is achieved by using a stored reference when modifying the operating mode of the bypass. For this purpose, the speed change may be assigned to a corresponding reference, resulting in a measure for the modification of the operating mode of the bypass. For example, the speed may be classified and a respectively stored reference may be held ready for different speed classes. This renders a complex mathematical operation superfluous when assigning an instantaneous speed to a particular operating mode of the bypass. As a result, the hardware outlay (computing power) is reduced on the one hand, and on the other hand, a rapid delivery of a result for a new operating mode of the bypass is enabled.

Examples for modifying the operating mode of the bypass include a change of a spark duration to a range between 2 ms and 4 ms, if the speed reaches a range between 1500 revolutions per minute (rpm) and 4500 rpm. A value of approximately 3 ms for the spark duration may result if the speed reaches a range above approximately 2000 rpm to 3000 rpm. Alternatively or in addition, the spark duration may be changed to 1 ms to 3 ms if the speed reaches a range between 3500 rpm and 5500 rpm. The spark duration may be set at approximately 2 ms if the speed reaches a range between 4000 rpm and 5000 rpm. Alternatively or in addition, the spark duration may be reduced to 0.5 ms to 2 ms if the speed reaches a range between 4500 rpm and 6500 rpm. A spark duration of approximately 1 ms, in particular, may be set if the speed reaches a range between 5500 rpm and 6500 rpm. Alternatively, a spark duration of 3 ms may be used in a speed range between 0 and 2500 rpm, a spark duration of 2 ms in the speed range between 2500 rpm and 4000 rpm, and a spark duration of 1 ms above 4000 rpm. The aforementioned speed classes and classes for spark durations may, for example, be stored as references in a memory and (for example, as a function of additional operating parameters) used for setting an instantaneous spark duration. Similarly, a modification of the ignition timing for the above-mentioned speed ranges could be predefined and saved. This enables a simple and robust evaluation of the speed and a rapid change of the spark duration in response to a new speed range.

According to one advantageous embodiment, the modification of the operating mode of the bypass includes as a first step the determination of a time interval of the voltage generation by the bypass as a function of the ascertained speed. In this way, the operating duration of the boost converter is also determined as a function of the ascertained speed. The bypass is subsequently operated in this predetermined time interval, as a result of which the duration of the ignition sparks, i.e., the so-called spark duration or spark burn duration, is controlled.

It is very advantageous if a time interval of the voltage generation is determined by appropriately classifying the ascertained speed under one of the speed intervals stored in a memory, the speed intervals each being assigned a predetermined time interval of the voltage generation and, therefore, a predefined operating duration of the boost converter. The time interval is then set to the time interval assigned to the appropriate speed interval.

The ignition system for an internal combustion engine, in which the method according to the present invention may be applied, includes a bypass for controlled maintenance of a spark generated with the aid of a primary voltage generator and an arrangement for ascertaining a speed of the internal combustion engine. In this way, a speed change may also be determined by the ignition system. The ignition system also includes a arrangement for modifying the operating mode of the bypass in response to an ascertained speed change. The speed change may be communicated, for example, by an engine control unit to the ignition system, in which case the arrangement for ascertaining the speed change merely carry out an evaluation of the signal of the engine control unit. Alternatively, the arrangement may also evaluate a crank angle over time, so that an external delivery of a speed signal is not required. The arrangement for modifying the operating mode of the bypass may include, for example, a control unit for a boost converter within the bypass, the control unit activating a switch within the boost converter for providing electrical energy for the ignition spark. In principle, the features, feature combinations and the associated advantages correspond to those of the method according to the present invention, so that to complete the disclosure and to avoid repetitions, reference is made to the statements made in connection with the first named inventive aspect.

The ignition system may be configured to evaluate a crank angle over time via an electrical control or an analog circuit, a microcontroller, an ASIC or an FPGA within the ignition system, in order to ascertain a speed change. This makes it possible to use hardware already existing in conventional ignition systems. The aforementioned hardware may be situated, for example, in an electronics unit of the ignition system. This makes a simple construction and implementation of the present invention possible without additional hardware.

The ignition system may include a memory arrangement, with the aid of which the ignition system is configured to classify the speed and/or the speed change. For this purpose, ascertained speeds are compared with references or threshold values stored in the memory arrangement, to which, in turn, instructions for changing or adjusting the operating mode of the bypass are assigned. In this way, a simple logic may be used for the operation according to the present invention of the ignition system. Costly hardware is unnecessary.

Exemplary embodiments of the present invention are described in detail below with reference to the accompanying drawings.

DETAILED DESCRIPTION

Figure 1:
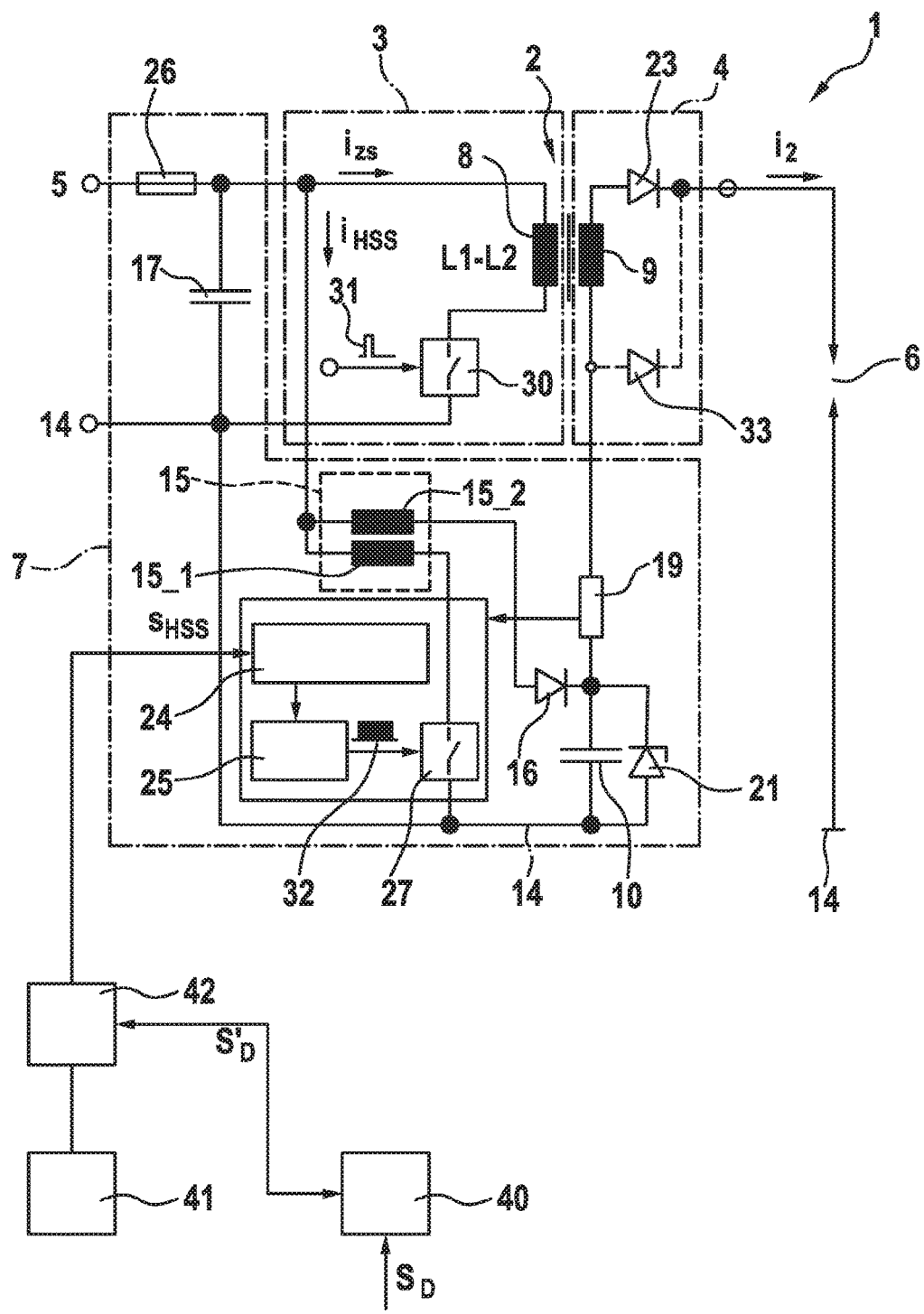
FIG. 1 shows a circuit diagram according to one exemplary embodiment of an ignition system, in which the method according to the present invention may be used.

FIG. 1 shows a circuit of an ignition system 1, which includes a step-up transformer 2 as a high voltage generator, which is made up of two coupled inductances L1, L2, namely, a primary coil 8 and a secondary coil 9, and the primary side 3 of which may be supplied with energy from an electrical energy source 5 via a first switch 30. A fuse 26 is provided at the input of the circuit, in other words, therefore, at the terminal with electrical energy source 5. In addition, a capacitance 17 for stabilizing the input voltage is provided in parallel to the input of the circuit or in parallel to electrical energy source 5. Secondary side 4 of step-up transformer 2 is supplied with electrical energy via an inductive coupling of primary coil 8 and secondary coil 9, and includes a diode 23 known from the related art for suppressing the powering spark, this diode being alternatively substitutable with a diode 21. A spark gap 6, via which ignition current $i_2$ is intended to ignite the combustible gas mixture, is provided in a loop with secondary coil 9 and diode 23 against an electrical ground 14.

A bypass 7, which includes, for example, the electronic components of a boost converter, namely an inductance 15, a switch 27, a capacitance 10 and a diode 16, is provided between electrical energy source 5 and secondary side 4 of step-up transformer 2. In this bypass 7, inductance 15 is provided in the form of a transformer having a primary side 15_1 and a secondary side 15_2. Inductance 15 in this case serves as an energy store for maintaining a current flow. Two first terminals of primary side 15_1 and secondary side 15_2 of the transformer are each connected to electrical energy source 5 and fuse 26. In this configuration, a second terminal of primary side 15_1 is connected via switch 27 to electrical ground 14. A second terminal of secondary side 15_2 of the transformer is connected without a switch directly to diode 16 which, in turn, is connected via a node to a terminal of capacitance 10. This terminal of capacitance 10 is connected, for example, via a shunt 19 to secondary coil 9 and another terminal of capacitance 10 is connected to electrical ground 14. The power output of the boost converter is fed via the node at diode 16 into the ignition system and provided to spark gap 6.

Diode 16 is oriented conductively in the direction of capacitance 10. The structure of the bypass is therefore comparable to a boost converter. Due to the transfer ratio, a switching operation by switch 27 in the branch of primary side 15_1 also acts on secondary side 15_2. However, since current and voltage according to the transformation ratio are higher or lower on the one side than on the other side of the transformer, more favorable dimensionings for switch 27 for switching operations may be found. For example, lower switching voltages may be implemented, as a result of which the dimensioning of switch 27 is potentially simpler and more cost-effective. Switch 27 is controlled via a control 24, which is connected via a driver 25 to switch 27. Shunt 19 is provided as a current measuring arrangement or voltage measuring arrangement between capacitance 10 and secondary coil 9, the measuring signal of which is fed to control 24. In this way, switch 27 is configured to react to a defined range of current intensity $i_2$ through secondary coil 9. A Zener diode is connected in the reverse direction in parallel to capacitance 10 for securing capacitance 10. Furthermore, control 24 receives a control signal $S_{HSS}$. Via this signal, the feed of energy or power output via bypass 7 into the secondary side may be switched on and off. In the process, the output of the electrical variable introduced by the bypass and into the spark gap, in particular via the frequency and/or pulse-pause ratio, may also be controlled via a suitable control signal $S_{HSS}$. A switching signal 32 is also indicated, with the aid of which switch 27 may be activated via driver 25. When switch 27 is closed, inductance 15 is supplied with current via electrical energy source 5, which flows directly to electrical ground 14 when switch 27 is closed. When switch 27 is open, the current is directed through inductance 15 via diode 16 to capacitor 10. The voltage occurring in response to the current in capacitor 10 is added to the voltage dropping across second coil 9 of step-up transformer 2, thereby supporting the electric arc at spark gap 6. In the process, however, capacitor 10 is discharged, so that by closing switch 27, energy may be brought into the magnetic field of inductance 15, in order to charge capacitor 10 with this energy again when switch 27 is re-opened. It is apparent that control 31 of switch 30 provided in primary side 3 is kept significantly shorter than is the case for switch 27. Optionally, a non-linear two-terminal circuit, symbolized by a high voltage diode 33 in the following, of the coil of the boost converter on the secondary side, may be connected in parallel. This high voltage diode 33 bridges high voltage generator 2 on the secondary side, as a result of which the energy or power output delivered through bypass 7 is guided directly to spark gap 6, without being guided through secondary coil 9 of high voltage generator 2. No losses across secondary coil 9 occur as a result and the degree of efficiency is increased. A speed dependency according to the present invention of the operating mode of the bypass is possible with an engine control unit (ECM) 40, which receives a first speed signal $S_D$ and outputs a second speed signal $S_D'$ to an electrical circuit 42. Electrical circuit 42 is further connected to a memory 41, from which values for speed ranges and references assigned to the speed ranges may be read out. Electrical circuit 42 is configured to influence the operating mode of bypass 7, to supply control 24 with a speed-related, modified control signal $S_{HSS}$, in response to which driver 25 supplies switch 27 with a modified switching signal 32. For example, a duration over which bypass 7 supplies spark gap 6 with electrical energy may be set at 3 ms, 2 ms or 1 ms.

Figure 2:
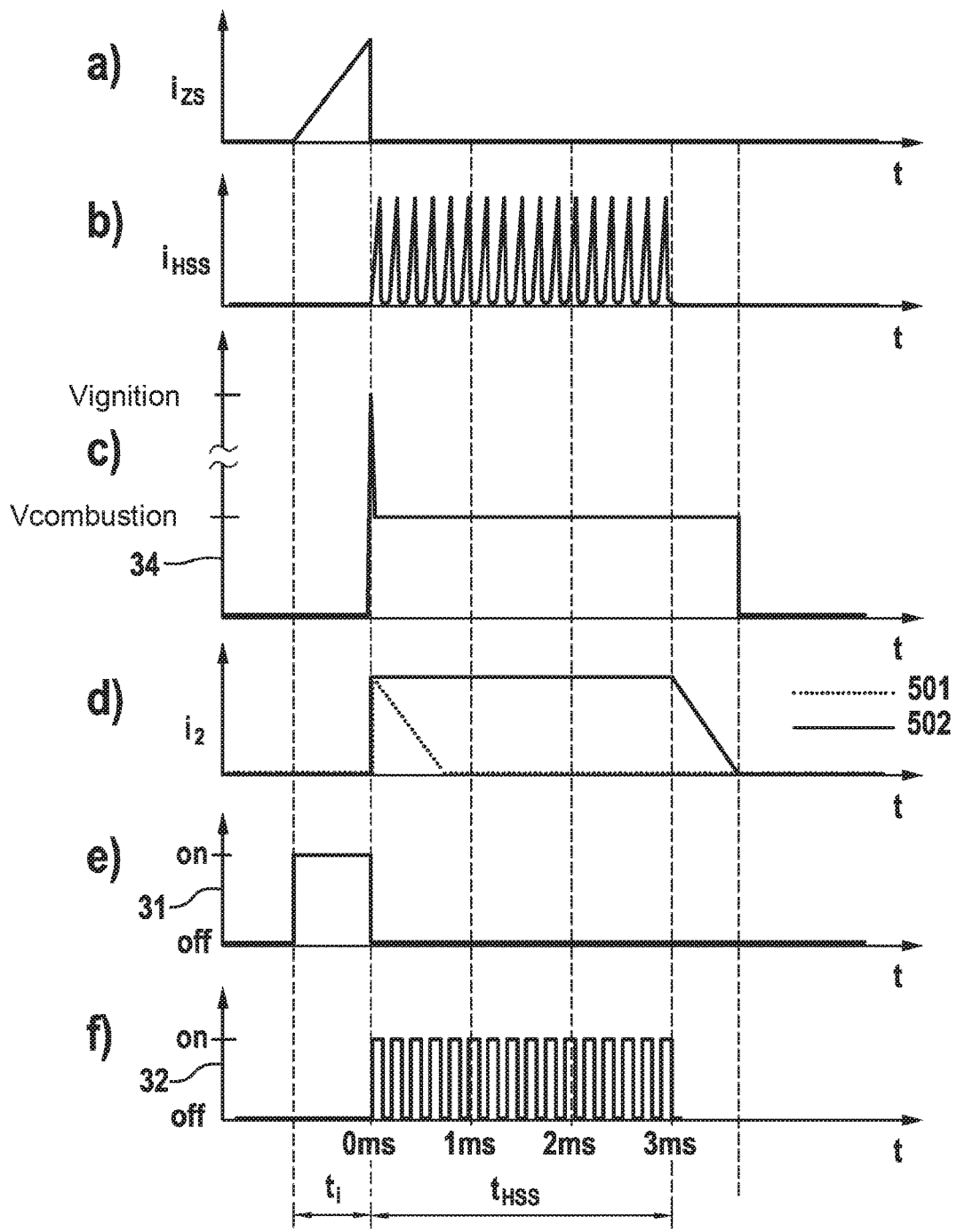
FIG. 2 shows representations of current-time diagrams and associated switching sequences for the circuitry shown in FIG. 1.

FIG. 2 shows time diagrams for a) ignition coil current $i_{zs}$, b), associated bypass current $i_{HSS}$, c), the voltage on the output side across spark gap 6, d) secondary coil current $i_2$ for the ignition system depicted in FIG. 1 without (501) and with (502) the use of bypass 7, e) switching signal 31 of switch 30 and f) switching signal 32 of switch 27. In particular: Diagram a) shows a short and steep rise in primary coil current $i_{zs}$, which occurs during the time in which switch 30 is in the conductive state ("ON," see diagram 3e). With switch 30 switched off, primary coil current $i_{zs}$ also drops to 0 A. Diagram b) illustrates in addition the current consumption of bypass 7, which arises as a result of pulsed activation of switch 27. In practice, clock rates in the range of several 10 kHz have proven to be a reliable switching frequency, in order to achieve corresponding voltages on the one hand and acceptable degrees of efficiency on the other hand. The integral multiples of 10,000 Hz in the range of between 10 kHz and 100 kHz are cited by way of example as possible range limits. To regulate the output delivered to the spark gap, a, in particular, stepless control of the pulse-pause ratio of signal 32 is recommended for generating a corresponding output signal. Diagram c) shows profile 34 of the voltage occurring at spark gap 6 during the operation according to the present invention. Diagram d) shows the profiles of secondary coil current $i_2$. Once primary coil current $i_{zs}$ results in 0 A due to an opening of switch 30, and the magnetic energy stored in the step-up transformer is discharged as a result in the form of an electrical arc across spark gap 6, a secondary coil current $i_2$ occurs, which rapidly drops toward 0 without bypass (501). In contrast to this, an essentially constant secondary coil current $i_2$ (502) is driven across spark gap 6 by a pulsed activation (see diagram f, switching signal 32) of switch 27, secondary current $i_2$ being a function of the burning voltage at spark gap 6 and, for the sake of simplicity, a constant burning voltage being assumed here.

Only after interruption of bypass 7 by continually opening switch 27, does secondary coil current $i_2$ then also drop toward 0 A. It is apparent from diagram d) that the descending flank is delayed by the use of bypass 7. The entire period of time during which the bypass is used, is characterized as $t_{HSS}$ and the period of time during which energy is passed into step-up transformer 2 on the primary side, as $t_i$. The starting time of $t_{HSS}$ as opposed to $t_i$ may be variably selected. In addition, it is also possible to increase the voltage supplied by the electrical energy source via an additional DC-DC converter (not depicted), before this voltage is further processed in bypass 7. It is noted that specific designs are a function of many external boundary conditions inherent to circuitry. The involved person skilled in the art is not presented with any unreasonable problems in undertaking the dimensionings suitable for this purpose and for the boundary conditions that must be taken into consideration.

Figure 3:
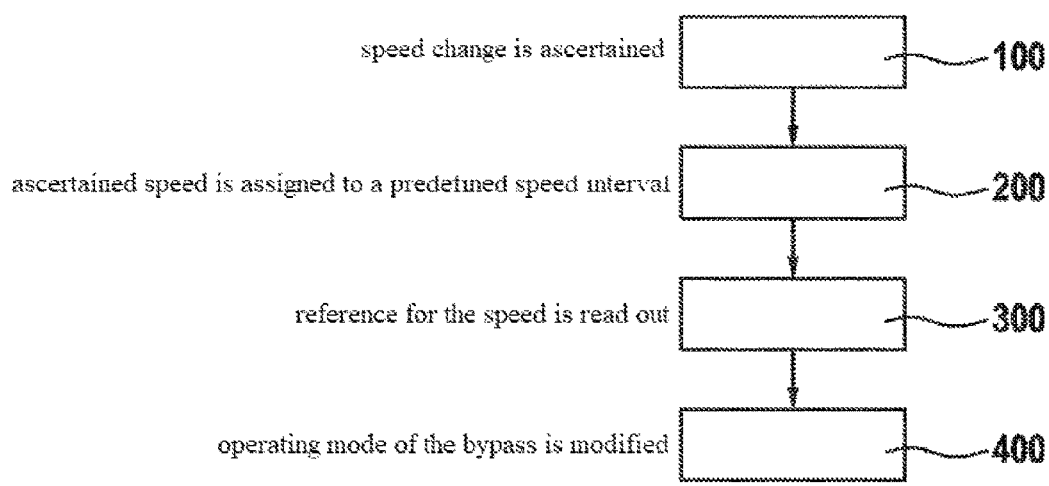
FIG. 3 shows a flow chart, illustrating steps of one exemplary embodiment of the method according to the present invention.

FIG. 3 shows a flow chart, illustrating the steps of one exemplary embodiment of the method according to the present invention. A speed change of an internal combustion engine used with the ignition system is ascertained in step 100. This may take place—as described above—within the ignition system using a signal of an engine control unit or by evaluating a crankshaft angle over time. The ascertained speed is classified in step 200, i.e., assigned to a predefined speed interval. A reference for the class found for the speed is further read out in step 300. With the aid of the reference, the operating mode of the bypass is modified in step 400 in a predefined way. For example, a duration over which bypass 7 supplies spark gap 6 with electrical energy may be set at 3 ms, 2 ms or 1 ms, or a starting time for starting the supply of energy by bypass 7 is delayed.

The time interval of the voltage generation is defined as a predetermined time period, in which bypass 7 supplies spark gap 6 with electrical energy. During this time interval of the voltage generation, switch 27 is cyclically switched on and off, resulting in a predetermined operating duration of boost converter 7.

According to one exemplary embodiment, the time interval of the voltage generation through bypass 7 is determined in each case as a function of the ascertained speed. Bypass 7 is subsequently operated in this predetermined time interval.

The determination of the time interval is carried out in such a way that speed intervals are stored in a memory of a controller, to which a predetermined time interval of the voltage generation is assigned in each case. The speed ascertained in step 100 is classified in step 200 under an appropriate speed interval, the time interval of the voltage generation being changed in each case to the time interval assigned to the appropriate speed interval (step 300, 400).

A computer program may be provided, which is configured to carry out all described steps of the method according to the present invention. The computer program in this case is stored on a memory medium. As an alternative to the computer program, the method according to the present invention may be controlled by an electrical circuit provided in the ignition system, an analog circuit, an ASIC or a microcontroller, which is configured to carry out all described steps of the method according to the present invention.

Even though the aspects and advantageous specific embodiments according to the present invention have been described in detail with reference to exemplary embodiments explained in conjunction with the appended drawing figures, modifications and combinations of features of the depicted exemplary embodiments are possible for those skilled in the art, without departing from the scope of the present invention, the scope of protection of which is defined by the appended claims.

What is claimed is:

1. An ignition system, comprising:
   a processor configured for operating an ignition system for an internal combustion engine, which includes a first voltage generator and a bypass for maintaining a spark generated with the first voltage generator, by performing the following:
   ascertaining a speed of an internal combustion engine used with the ignition system; and
   modifying the operating mode of the bypass in response to a speed change,
   wherein the modifying of the operating mode of the bypass includes performing the following:
   determining a time interval of the voltage generation by the bypass as a function of the ascertained speed; and
   operating the bypass in the determined time interval,
   wherein the determination of a time interval of the voltage generation includes performing the following:
   classifying the ascertained speed under one of the speed intervals stored in a memory, each of the speed intervals being assigned a predetermined time interval of the voltage generation, and
   changing the time interval of the voltage generation to the time interval assigned to the appropriate speed interval.

2. The ignition system of claim 1, wherein the bypass includes a boost converter.

3. A for operating an ignition system for an internal combustion engine, which includes a first voltage generator and a bypass for maintaining a spark generated with the first voltage generator, the method comprising:
   ascertaining a speed of an internal combustion engine used with the ignition system; and
   modifying the operating mode of the bypass in response to a speed change,
   wherein the time interval of the voltage generation is the time interval in which a switch of the bypass is cyclically switched on and off.

4. A computer readable medium having a computer program, which is executable by a processor, comprising:
   a program code arrangement having program code for operating an ignition system for an internal combustion engine, which includes a first voltage generator and a bypass for maintaining a spark generated with the first voltage generator, by performing the following:
   ascertaining a speed of an internal combustion engine used with the ignition system; and
   modifying the operating mode of the bypass in response to a speed change,
   wherein the modifying of the operating mode of the bypass includes performing the following:
   determining a time interval of the voltage generation by the bypass as a function of the ascertained speed; and
   operating the bypass in the determined time interval,
   wherein the determination of a time interval of the voltage generation includes performing the following:
   classifying the ascertained speed under one of the speed intervals stored in a memory, each of the speed intervals being assigned a predetermined time interval of the voltage generation, and
   changing the time interval of the voltage generation to the time interval assigned to the appropriate speed interval.

5. The computer readable medium of claim 4, wherein the bypass includes a boost converter.

6. A for operating an ignition system for an internal combustion engine, which includes a first voltage generator and a bypass for maintaining a spark generated with the first voltage generator, the method comprising:
   ascertaining a speed of an internal combustion engine used with the ignition system; and modifying the operating mode of the bypass in response to a speed change,
wherein the modifying of the operating mode includes modifying a time interval of the voltage generation by the bypass,
wherein the modifying of the time interval of the voltage generation includes at least one of a shifting of the time interval across the crank angle, and a lengthening or shortening of the time interval.

7. A for operating an ignition system for an internal combustion engine, which includes a first voltage generator and a bypass for maintaining a spark generated with the first voltage generator, the method further comprising:
ascertaining a speed of an internal combustion engine used with the ignition system;
modifying the operating mode of the bypass in response to a speed change,
classifying the speed; and
comparing the class with a reference.

8. A for operating an ignition system for an internal combustion engine, which includes a first voltage generator and a bypass for maintaining a spark generated with the first voltage generator, the method comprising:
ascertaining a speed of an internal combustion engine used with the ignition system; and
modifying the operating mode of the bypass in response to a speed change,
wherein the modifying of the operating mode of the bypass includes a change of a spark duration to at least one of the following:
(i) 2 ms to 4 ms if the speed reaches a range between 1500 rpm and 4500 rpm,
(ii) 1 ms to 3 ms if the speed reaches a range between 3500 rpm and 5500 rpm, and
(iii) 0.5 ms to 2 ms if the speed reaches a range between 4500 rpm and 6500 rpm.

9. A method for operating an ignition system for an internal combustion engine, which includes a first voltage generator and a bypass for maintaining a spark generated with the first voltage generator, the method comprising:
ascertaining a speed of an internal combustion engine used with the ignition system; and
modifying the operating mode of the bypass in response to a speed change,
wherein the modifying of the operating mode of the bypass includes performing the following:
determining a time interval of the voltage generation by the bypass as a function of the ascertained speed; and
operating the bypass in the determined time interval,
wherein the determination of a time interval of the voltage generation includes performing the following:
classifying the ascertained speed under one of the speed intervals stored in a memory, each of the speed intervals being assigned a predetermined time interval of the voltage generation, and
changing the time interval of the voltage generation to the time interval assigned to the appropriate speed interval.

10. The method of claim 9, wherein the modifying of the operating mode includes modifying a time interval of the voltage generation by the bypass.

11. The method of claim 9, wherein at least one of the following is satisfied: (i) the ascertainment of the speed includes an evaluation of a signal of an engine control unit, and (ii) the ascertainment of the speed includes an evaluation of a crank angle over time.

12. The method of claim 9, further comprising:
modifying the operating mode of the bypass in accordance with a stored reference.

13. The method of claim 9, wherein the bypass includes a boost converter.

14. The method of claim 9, wherein at least one of the following is satisfied: (i) the ascertainment of the speed includes an evaluation of a signal of an engine control unit, in particular, a digital bus signal, and (ii) the ascertainment of the speed includes an evaluation of a crank angle over time, in particular, within an electrical circuit and/or an ASIC of the ignition system.

15. The method of claim 9, wherein at least one of the following is satisfied: (i) the ascertainment of the speed includes an evaluation of a signal of an engine control unit, in particular, a digital bus signal, and (ii) the ascertainment of the speed includes an evaluation of a crank angle over time.

* * * * *